Aug. 19, 1958  H. O. WOLCOTT  2,848,648
BAR GRAPH OSCILLOSCOPES

Filed May 9, 1956  2 Sheets-Sheet 1

TIME

*INVENTOR.*
HENRY O. WOLCOTT
BY  *Harry R. Lubcke*
AGENT

Aug. 19, 1958 H. O. WOLCOTT 2,848,648
BAR GRAPH OSCILLOSCOPES
Filed May 9, 1956 2 Sheets-Sheet 2

INVENTOR.
HENRY O. WOLCOTT
BY Harry R. Lubcke
AGENT

United States Patent Office 2,848,648
Patented Aug. 19, 1958

2,848,648
BAR GRAPH OSCILLOSCOPES

Henry O. Wolcott, Glendale, Calif., assignor, by mesne assignments, to International Telephone and Telegraph Corporation, a corporation of Maryland Application May 9, 1956, Serial No. 583,745

18 Claims. (Cl. 315—26)

My invention relates to means for producing a novel display upon a cathode-ray oscilloscope and particularly for producing simultaneously visible displays of the amplitude and polarity of electrical energies in a large number of independent electrical channels.

In modern technology there is need for examining a large number of independent variables in a manner which allows the operator to quickly discern individual or group departures of such variables from desired or safe limits. One such need is with respect to the temperatures in a jet engine, in which case the electrical outputs from as many as forty thermocouples are to be displayed before the operator. A similar display is required in long annealing ovens, or lears, for glass manufacture. In the test loading of an airplane wing the electrical outputs from a large plurality of strain gauges must be simultaneously examined. It will be appreciated that an accurate and facile presentation of these data does much to insure rapid and safe testing or processing of the items involved, safety for personnel and protection of valuable investments.

In the prior art a device capable of satisfactorily filling this need is not to be found. Attempts to switch a plurality of channels to a differential amplifier to allow such channels to be balanced with respect to ground and thus to be immune to general interfering currents were found to be futile. It was impossible to obtain the necessary precision in simultaneity of switching to avoid very great transients caused by the unbalance of one terminal being contacted before the other.

A magnetic modulator arrangement utilizing a carrier and bucking output windings on a high permeability iron core has been used in this field. However, in practical form this device takes considerable power from the originating channel, is subject to zero drift, to non-linearity and has inferior signal to noise performance. By employing an A. C. amplifier with feedback I avoid these difficulties.

I have achieved fully balanced and independent input channels by utilizing a pair of conductors insulated from ground and switching said conductors across the balanced primary of a transformer for A. C. amplification and subsequent display upon a cathode-ray oscilloscope. An interfering signal between either or both conductors to ground is attenuated 80 db or more with respect to the channel signal. The balanced conductors may be shielded in any desired manner. Although an effort is made to simultaneously connect and disconnect each conductor of each channel in the adjustment and operation of my motor-driven switch this is merely for purposes of good operation, since the effects of any unbalance or charging of the circuit are removed. I have found it important to maintain the impedance across the primary of the input transformer constant whether or not a channel is connected thereto and this is accomplished by novel impedance connection to and functioning of the motor-driven switch.

As compared with a magnetic amplifier, for instance, the linearity, freedom from drift and speed of response of a feedback vacuum tube amplifier is well known. I am able to use such an amplifier by providing a novel gated clamp circuit connected thereto to restore the direct current zero axis to the signal from each channel, said axis being lost in the transformer and A. C. amplifier mentioned. In a representative embodiment the motor-driven switch samples the channels at a rate of the order of 400 per second, with an interval between samples approximately equal to the duration of the sample. The results of this process are displayed upon the screen of a cathode-ray tube within the period of persistence of vision and with the retention of the usual phosphor afterglow so that for all practical purposes all channels are simultaneously represented.

An object of my invention is to provide a multichannel essentially-simultaneous display of electrical energies.

Another object is to provide a multichannel display of electrical energies having relatively great isolation of said channels from external (common mode) interference.

Another object is to provide a multichannel display in which electrical energies are shown according to either inherent positive or negative polarities.

Another object is to provide a multichannel display in which reference to the direct current "D. C." level, or zero axis, is accurately exhibited.

Another object is to provide a multichannel display having direct current zero reference, yet possessing the excellent linearity, good stability and freedom from drift of an alternating current feedback amplifier.

Another object is to provide a multichannel display in which the level of signal amplitude from each channel can be independently adjusted.

Another object is to provide a multichannel display in which each channel is represented as a dot of light on a cathode-ray screen at the direct current zero level and by another dot at the maximum amplitude of the electrical energy in said channel with a line of light connecting said dots for ease of observation.

Another object is to provide a multiplicity of amplified outputs for individually examining or recording the amplitudes and/or polarities of the electrical energies of the several signal channels.

Other objects of the invention will become apparent upon reading the following detailed specification and upon examining the related drawings, in which.

Figure 1:
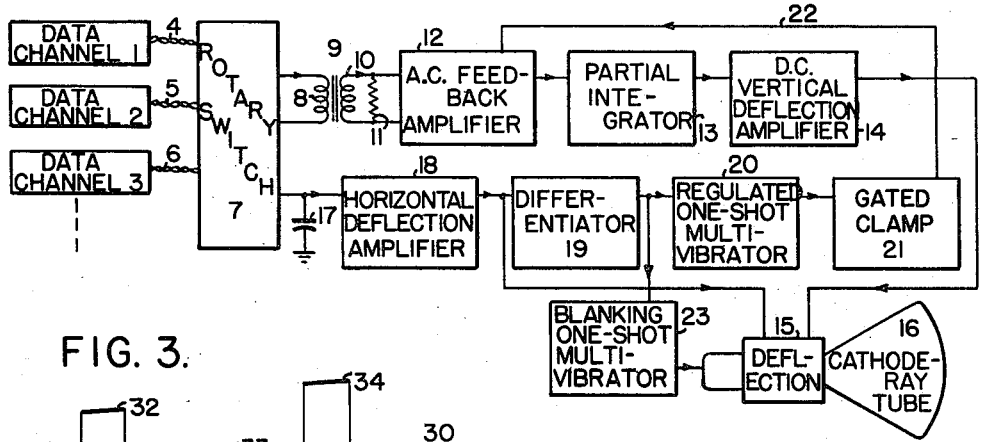
Fig. 1 shows a block diagram of my bar graph oscilloscope.

In Fig. 1 the data channels are identified by numerals 1, 2, 3 . . . , three channels being shown but as many as forty or considerably more being practical, particularly when a 21" diameter screen cathode-ray tube is used. Pairs of conductors 4, 5, 6 . . . connect the data channels to rotary switch 7. The data channels are often comprised of electrical transducers such as thermocouples, strain gauges, etc., and may be located at a distance of many feet from the display apparatus. Because of this fact and the prevalence of sixty cycle magnetic and electrostatic fields due to commercial electric power circuits, the presence of electromagnetic wave energy of radio, television and other stations, and magnetic disturbances avoiding interference in the data channel circuits is highly important. For this reason the conductors are shown in twisted pairs. Electrostatic and/or magnetic shielding may also surround these conductors as known and practiced in the art for low signal level circuits.

Rotary switch E preferably has four stationary contacts in two circumferential series associated with each channel and an additional stationary contact in a third series spatially related to the other stationary contacts for generating a stepped voltage waveform to position the cathode-ray tube electron beam at discrete horizontal locations so that the amplitude of the electrical energy of each data channel may be uniquely displayed vertically. A fourth series of related stationary contacts allows decommutation for individual recording of the channel signals. Two rotary contacts bear upon the first-mentioned group of four stationary contacts and a third and a fourth rotary contact bear upon the third and fourth series of stationary contacts, respectively. The two rotary contacts connect to primary 8 of transformer 9. In each group of four stationary contacts, a pair thereof connect to the data channel with resistance in series and a capacitor across the signal source. The next pair of stationary contacts are connected to a "dummy" resistance of value equal to that first mentioned and in a manner to be later explained accurately simulates the impedance of the former resistance, capacitor and signal source.

Transformer 9 is preferably one of good audio frequency characteristics having a high permeability toroidal tape-wound core to achieve low capacitance between primary, secondary and core. This aids in preventing transients in the switching process and increases the common mode rejection. As to the latter, external interference currents flow only because of the spurious capacitances mentioned, and when these are of low value the rejection is correspondingly high. However, the usual punched laminated steel core with concentrically wound primary and secondary will perform satisfactorily in my apparatus. Fixed resistor 11 loads transformer 9 slightly, to eliminate ringing transients and also to reflect a fixed and known resistive impedance back to the primary.

A. C. feedback amplifier 12 is provided to increase the signal level obtained from the data channels, to provide adequate level for gated clamping upon a cathode-follower vacuum tube stage and to supply a high input signal level to the following D. C. amplifier 14 for high stability.

Partial integrator 13 is constituted to incompletely integrate the sampling signal pulses produced by switch 7 in switching from one data channel to the next so that a line will be displayed between the dot and on the cathode-ray screen produced by the electron beam resting briefly at the zero or D. C. level and subsequently at the amplitude corresponding to the level of electrical energy in a data channel. The trace is of great assistance in quickly discerning the amplitude and polarity of the display for each channel and clearly indicates the number of the channel involved. I prefer to number the channels along the zero axis on an overlay over the cathode-ray tube screen.

D. C. vertical deflection amplifier 14, also preferably of the negative feedback type, raises the partially integrated signal to a level suitable for deflecting the electron beam over at least half of the cathode-ray tube screen. The D. C. axis is normally situated at the center of the screen vertically so that both positive and negative polarities of electrical amplitude can be reproduced. Deflection means 15 is located at the neck of the cathode-ray tube. It is usually comprised of two pairs of coils but may be two pairs of deflection plates within the tube.

Capacitor 17 is connected to the third rotary contact of switch 7 and also to an otherwise unconnected grid of the first vacuum tube of horizontal deflection amplifier 18. The output of this amplifier is connected to the portion of deflection means 15 causing deflection at or about right angles to the previously mentioned deflection.

Also connected to this output is a synchronizing connection to differentiator 19. The later produces synchronizing spikes (or narrow pulses) from each rise in the stepped voltage from switch 7 and capacitor 17. Regulated one-shot multivibrator 20 produces pulses timed from each spike to unclamp gated clamp 21 during the sample time of the data channels and to allow this clamping action during the interval between samples, to the end that the proper amplitude of each can be displayed. This is accomplished by the output of gated clamp 21 being impressed upon the grid of the cathode-follower vacuum tube in amplifier 12 via conductor 22.

Blanking one-shot multivibrator 23 is also synchronized by the spike output of differentiator 19. The former provides negative pulses for blanking out leading residual transients accompanying each signal sample, these pulses being applied to the grid or other electron beam control electrode of cathode-ray tube 16.

Figure 2:
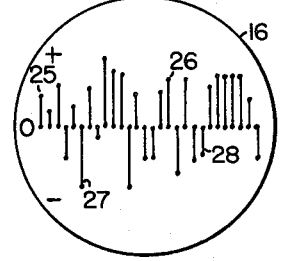
Fig. 2 shows the nature of the display upon the cathode-ray screen.

Fig. 2 shows the screen of cathode-ray tube 16 and an illustrative group of individual channel magnitudes. Some are of one polarity, positive, as at 25 and 26, while others are negative, as at 27 and 28, indicating considerably different conditions in different channels.

Figure 3:
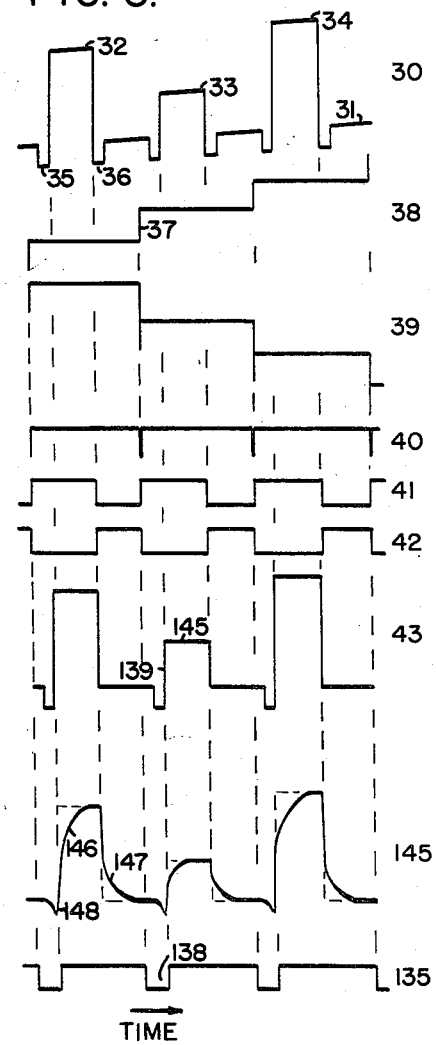
Fig. 3 shows several waveforms in timed space relationship concerned with the operation of my invention.

Fig. 3 shows the sequence of waveforms through my oscilloscope, starting with the waveform present in the first amplifier, 12, and ending with the waveform applied to the vertical deflection means (part of element 15) and a blanking waveform applied to the cathode-ray tube beam. This figure will be explained with the description of the detailed schematic circuit of Fig. 4 which follows.

Figure 4:
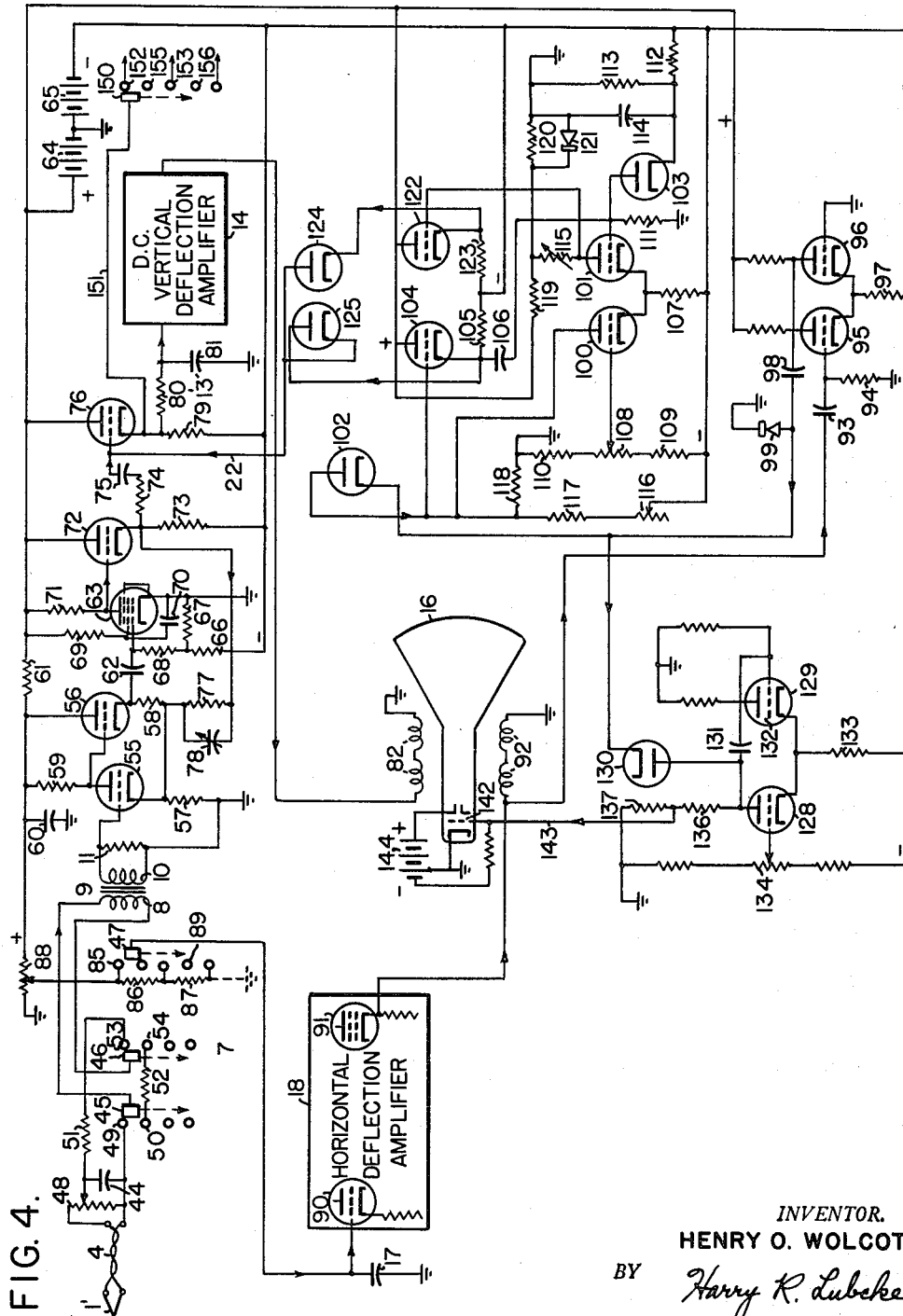
Fig. 4 shows the schematic diagram for my bar graph oscilloscope.

Data channel 1 is shown in Fig. 4 as a thermocouple 1' having twisted leads 4 which extend from the point of measurement to the oscilloscope at the point of observation. Rotary switch 7 has a minimum of three series of stationary contacts, which are swept over by rotary contacts 45, 46 and 47. The fourth series and rotary contact 150 at the right of the figure are for decommutation and will be discussed later.

For each data channel a capacitor 44 and fixed resistors 51 and 52 are required. Potentiometer 48 is a very desirable but not necessary accessory, allowing individual adjustment of the signal level in the several channels. Potentiometer 48 preferably has an overall resistance value many times the internal impedance of the thermocouple or other transducer of the data channel and thus lightly loads it. Resistor 51 sets the source impedance for primary 8 of transformer 9. Capacitor 44 charges to the potential existing because of the energy produced by transducer 1', and for the very brief period of sampling when rotary contacts 45 and 46 are connected to stationary contacts 49 and 53 for that channel the capacitor serves as an energy source of very nearly zero impedance. As the rotary contacts progress downward in making the transition from one channel to the next, the transformer primary is substitutionally terminated by resistor 52, which has the same value of resistance as resistor 51.

I have found that the important criterion for retaining a restorable D. C. axis in this oscilloscope comprised of a switched transformer and following A. C. coupled amplifier, consists in maintaining the source impedance of the primary constant over nearly all instants of time to within narrow limits. Departure from this criterion results in such serious axis distortion that the zero, or D. C. axis cannot be restored by any means. This has been the major difficulty that has prevented the prior art from accomplishing my invention.

Without imposing a limitation I have found that a primary impedance of the order of 2,500 ohms is a desirable value for a transformer of optimum characteristics for this work. This means that both resistors 51 and 52 then have a value of the order of 2,500 ohms and capacitor 44 a capacitance of the order of 10 microfarads; the sampling rate being of the order of 400 per second and the duration of the sample something over one millisecond. The transformer may conveniently have a turns ratio of two to one, in which case the secondary load impedance is properly of the order of 10,000 ohms, i. e., the value of resistor 11, and the overall voltage gain is unity. The half voltage across the primary of the transformer because of resistor 51 in series is compensated for by the two to one voltage step up ratio.

In a rotary switch the circumferential length of the rotary contacts are usually slightly longer than the space between two adjacent stationary contacts so that the former will ride evenly and not fall into the spaces between the stationary contacts. For the brief instant when rotary contact 45 touches both contacts 49 and 50 and when contact 46 touches both contacts 53 and 54 there will be a condition of half primary impedance and half input signal voltage because resistor 52 as well as the channel is shunted across primary 8. However, I eliminate this anomaly and certain residual switching transients from the display on the screen of the cathode-ray tube by a combination of gating and blanking to be described later.

The path of a representative signal now having been traced from transducer through amplitude-adjusting potentiometer, signal capacitor, primary impedance resistor, switch contacts, substitutional dummy primary impedance resistor, transformer primary and loaded transformer secondary we are now in a position to consider the five following vacuum tubes in Fig. 4. These comprise the A. C. feedback amplifier 12 of Fig. 1.

The waveform of a representative signal as existing at the secondary of transformer 9 or within the initial stages of amplifier 12 is given as waveform 30 in Fig. 3. Axis 31 is shown with a slant inclined upward to the right. I have noted this characteristic, the slope of which may be in either direction depending upon the average electrical energy value preceding the particular portion of the waveform examined. Signal peaks 32, 33 and 34 represent those which produce the first three channel amplitudes on the display of Fig. 2, starting with identification numeral 25. Excursion 35, leading each channel signal, such as 32, and excursion 36 following the same, are caused by either a momentary open circuit due to inescapable inaccuracy in construction of the rotary switch or because of a momentary period of half channel signal at half source impedance caused by the rotary contacts contacting two pairs of stationary contacts. Excursions 35 may be in either direction, depending upon whether an open circuit, a half signal or prior history is controlling.

Triodes 55 and 56 coact as a direct-coupled cathode output pair. It is noted that the plate of triode 55 is direct-coupled to the grid of triode 56 and that the latter triode is connected to the former so that degeneration is not experienced in the first cathode resistor 57. The output is taken across second cathode resistor 58. Resistor 59 is the first triode plate resistor for deriving useful output from that tube, while capacitor 60 is a filter capacitor of large size to accomplish resistance-capacitance filtering in combination with plate dropping resistor 61.

Coupling capacitor 62 conveys the signal to the next pair of direct-coupled vacuum tubes and thus makes the feedback amplifier 12 an A. C. rather than a D. C. amplifier. The plate current power supply for my device has a portion 64 supplying a voltage a few hundred volts above ground and another portion 65 supplying the same voltage below ground. A negative bias for pentode 63 is obtained from portion 65 by voltage divider 66, 67, the bias being applied to the control grid of the tube through grid resistor 68. Resistor 69 is the screen grid voltage dropping resistor and capacitor 70 the bypass filter for the same, while resistor 71 is the plate resistor. A direct connection is taken from the plate end of that resistor, which is of high value, to the grid of following triode 72.

Cathode signal output resistor 73 for that triode is connected to the negative voltage source in order that signal excursions may extend below ground potential as well as above it. Resistor 74 is merely a small-valued isolation resistor and coupling capacitor 75 conveys the signal to triode 76, another cathode-follower and the one at the grid of which the zero axis level is reinserted by means of circuitry to be described later.

Feedback for this amplifier is taken from the cathode end of resistor 73 and impressed back upon the cathode of first triode 55. Feedback resistor 77 is in the megohm range and variable air capacitor 78 has a value of a few micromicrofarads. It is desirable that this amplifier be critically damped, i. e., not "ring," and that it have a low frequency response below that of transformer 9 for preserving the shape of waveform 30.

The main signal, suitably clamped, appears across cathode resistor 79 of triode 76, the important cathode-follower of amplifier 12, and thence traverses partial integrating elements, resistor 80 and shunt capacitor 81. These elements are identified as the partial integrator 13 in Fig. 1. The signal output therefrom appears as waveform 145 in Fig. 3. From this point, direct-coupled amplification of an amount to provide at least half-screen amplitude reflection both above and below a center zero axis upon cathode-ray tube 16 is provided by D. C. vertical deflection amplifier 14, which is conventional and thus need not be detailed. Deflection is accomplished by current flow in vertical deflection coils 82.

We now return to the rotary switch 7, considering stationary contact 85 and the others of the circumferential series coacting with rotary contact 47. Between each of the active stationary contacts are equal-valued resistors 86, 87, etc., the first of which is connected to potentiometer 88 and the last of which is connected to ground, which is shown dotted to indicate that as many thus connected contacts 85 are provided as channels of data to be displayed. Alternate contacts 89 remain unconnected to provide the same pitch between active contacts as between active channel contacts previously described.

With respect to the data channel connections proper, only one channel of the three shown in Fig. 1 has been detailed in Fig. 4. It will be understood that for 40 channels there would be 80 contacts in the first two series and 40 active contacts in the third series. The rises 37 in the stepped waveform 38 of Fig. 3 produced by rotary contact 47 are phased slightly ahead of corresponding contacting by rotary contacts 45, 46 and the coacting stationary contacts 49, 53, etc. This is also shown by noting the time phase of the several waveforms in Fig. 3 with the assistance of the dotted vertical lines. In this way the gating function, to be later described, occurs just before a signal channel is sampled.

The potential of each of the active contacts 85 is successively transferred to rotary contact 47 and is retained by shunt capacitor 17 in the interval between potential-bearing contacts. This capacitor is the only connection to the grid of the first tube 90 of horizontal deflection amplifier 18; which tube is preferably cathode-follower connected. Waveform 38 of Fig. 3 is that found at the grid of tube 90 and the function of amplifier 18 is to amplify the same to a level sufficiently high to deflect the electron beam of cathode-ray tube 16 fully across the screen of that tube in coaction with horizontal deflection coils 92. This positions the electron beam at multiple horizontal locations across the face of the cathode-ray tube with a dwell at each corresponding to the horizontal portions of waveform 38, the dwell being sufficiently long to permit formation of dots top and bottom of the channel being displayed and a trace between the dots. The latter are usually executed vertically at right angles to the stepped waveform deflection and are accomplished by deflection energy through deflection coils 82 as previously described. Amplifier 18 preferably includes several vacuum tubes, but is conventional and thus has not been detailed. A cathode-follower output stage 91 has been indicated but this type is not essential.

The clamping, gating and blanking functions of my inventions remain to be detailed. This is accomplished in describing the remaining apparatus of Fig. 4. These functions must be accurately timed with respect to the operation of switch 7. The rises 37 of the stepped waveform 38 are utilized to form synchronization pulses as shown by waveforms 39 and 40 of Fig. 3. With the magnetic deflection means 92 the partially differentiated voltage waveform 39 appears across said means. This waveform is completely differentiated by additional calculus-function elements 93, 94; capacitor 93 being of relatively high reactance to the frequency of the sampling waveform involved and resistor 94 having a resistance relatively low in relation to the reactance of the capacitor. At the top of resistor 94 waveform 40 of Fig. 3 results.

Triodes 95 and 96 comprise a non-phase-inverting amplifier, the coupling therebetween being through common cathode resistor 97. Coupling capacitor 98 removes plate potential from the spike signal and crystal diode 99 clamps an amplified form thereof to ground.

Triodes 100 and 101, with diodes 102 and 103 constitute a regulated monostable or one-shot multivibrator. Triode 100 is normally non-conducting and triode 101 normally conducting. Negative pulses 40 pass through diode 102 since these are applied to the cathode thereof. Triode 104 is a cathode-follower tube which conveys these negative pulses to the grid of triode 101, where each pulse cuts this tube off, making it non-conducting rather than conducting. The cathode resistor of this follower is 105 and 106 is a timing capacitor, which latter is rapidly charged through the low impedance cathode-follower tube 104. This tube also feeds gate 125 at low impedance.

With triode 101 cut off the potential at the cathode end of the common cathode resistor 107 becomes much less positive than with triode 101 conducting, hence, with the grid of triode 100 remaining relatively fixed in potential the less positive cathode causes triode 100 to conduct. The potential of the grid of triode 100 is adjusted by potentiometer 108, which, in series with resistors 109 and 110, is connected across the negative voltage supply to ground. This potential determines how long triode 100 shall conduct before the charge on the grid of triode 101 leaks off through resistor 111 and the multivibrator reverts back to its resting condition of triode 101 conducting and triode 100 cut off. Potentiometer 108 is thus a control determining the duration of the gating pulse. These pulses appear as waveforms 41 and 42 in Fig. 3, waveform 41 appearing at the plate of triode 101 and waveform 42 at the plate of triode 100. The amplitude of each is actually greater than the amplitude of the largest signal to be handled at the grid of cathode-follower 76 to insure that the gating action shall be fully on and fully off at that point.

Diode 103 stabilizes the operating potential of triode 101 during its conducting time in coaction with voltage divider 112 and 113 connected between the negative voltage supply, ground and capacitor 114 shown. The portion 115 of the plate resistor for triode 101 is made variable as a balance control to insure that diode 124 (gating) conducts slightly while clamping. By adjusting resistor 115 the potential of the cathode of diode 124 can be made, say, minus two volts with respect to ground and thus overcome the contact potential of that diode. Similarly, variable resistor 116 is a balance control, setting the potential at the plate of triode 100 so that this value, through cathode-follower 104, will result in a slightly positive potential at the plate of diode 125, overcoming the contact potential of that diode. Resistors 117 and 118 form the remainder of the voltage divider along with variable resistor 116 from the negative voltage source 65 to ground, resistor 118 also constituting the plate resistor for triode 100.

Resistors 119 and 120 form a voltage divider from the positive voltage source 64 to ground to determine the positive supply voltage for triode 101 and thus the maximum waveform amplitude when the triode is cut off. Diode 121 also coacts to determine this voltage swing since it determines that when triode 101 is conducting the pulse will go negative to approximately zero volts. Any further negative excursion is halted by diode conduction. (The cathode of triode 101 is connected to the negative supply voltage through resistor 107, hence a further excursion would otherwise be possible.)

One part of the useful output of the multivibrator system described is taken in the form of waveform 41 from the plate of triode 101 and direct coupled to the grid of cathode-follower triode 122. The output therefrom is obtained from cathode resistor 123 and is impressed upon the cathode of diode gate 124. The cathode-follower provides a signal source of desirably low impedance for the operation of the gate.

The other part of the multivibrator output is similarly taken from cathode resistor 105 of cathode-follower 104 (waveform 42) and direct coupled to the plate of the second diode gate 125, providing a double diode gate having oppositely poled square wave excursions from the zero potential of ground.

The output of this double gate is applied through conductor 22 to the grid of triode 76 of amplifier 12. Capacitor 75 having relatively small capacitance, this grid is clamped to ground by the gate in the intervals between signal samples taken by switch 7. During the time of each channel signal sample the clamping is removed by the appropriately timed excursions of waveforms 41 and 42. The axes of the several signal channels are brought to a common level and the following (after the signal) transient is removed by this gating and clamping operation, resulting waveform 43 of Fig. 3.

When the gate is closed any interference or noise in the system does not affect the clamping level, nor is any output produced. The pulse amplitudes are adjusted in the multivibrator system to keep double gate 124, 125 in a state of slight conduction instead of no current flow on such excursions as has been explained.

The blanking one-shot multivibrator 23 of Fig. 1 is composed of triodes 128 and 129 in Fig. 4. The multivibrator is of the same type as that composed of triodes 100 and 101, save that cathode-follower tubes 104 and 122 are not required and are not included. The blanking multivibrator is synchronized by the negative spikes of waveform 40 of Fig. 3 in the same way as the first multivibrator. These spikes pass through diode 130, and passing also through capacitor 131 are impressed upon grid 132 of triode 129 where the same cut that tube off, that tube being normally conducting.

The second multivibrator is energized by a negative supply voltage applied to the cathodes through common cathode resistor 133. The plate end of the circuit is relatively positive by being connected to ground. When triode 129 ceases to conduct the common cathode potential becomes more negative and so triode 128 conducts as has been explained before. How long triode 128 conducts is determined by the setting of potentiometer 134, as before.

Waveform 135 of Fig. 3 is that appearing at the partial voltage output tap between plate resistor portions 136, 137. The initial edge of each negative pulse 138 is seen to occur at the same time as the negative spikes of waveform 40 while the terminating edge is the one determined in time by the setting of potentiometer 134. The latter is adjusted to coincide in time with the leading edge of each of the channel signals, as edge 139 of pulse 140 in waveform 43.

The blanking pulses 135 are applied to grid 142 of cathode-ray tube 16 via conductor 143. Battery 144 energizes the cathode and anode thereof as well as the grid with the usual operating potentials. The negative pulses on the grid extinguish the spot of light on the fluorescent screen of the cathode-ray tube and so the leading spurious transients 148 of waveform 145 are not seen.

What further takes place is detailed in waveform 145. As has been mentioned, elements 80 and 81 of Fig. 4 comprise partial integrator 13 of Fig. 1 and accomplish partial integration of waveform 43 of Fig. 3. In this process each vertical excursion of the waveform starts fairly rapidly but becomes slower in time as the excursion progresses. This is shown at 146 for an upward excursion and at 147 for a downward excursion. Referring to Fig. 2 it will be seen that each display, as 25 for instance, will have the latter portion of the upward excursion relatively bright because of the slower writing speed of the cathode-ray beam thereat, while the same functioning being true downward with respect to time causes the combination of the traces to be of substantially equal intensity all along the line connecting the spots of light caused by the dwells at the tops of the signal pulses and at the zero axis. Thus, waveform 145 produces the presentation on the screen of Fig. 2 and with the beam extinguishment by the negative pulses of waveform 135 eliminating the now partially integrated leading transients 148, only the desired data concerning the amplitudes of the electrical energies in the signal channels are presented.

The above concludes the description of the essential aspects of my invention, but there remains an important auxiliary aspect. This is shown in Fig. 4 as rotary contact 150, which is connected by conductor 151 to the clamped and gated output of cathode-follower tube 76. Also a part of switch 7, stationary contacts 152, 153, etc. have the same spatial positions as the original series 49, etc. and 53, etc. with blank stationary contacts 155, 156, etc. of the new series corresponding to those in the original series to which dummy resistors are attached. Rotary contact 150 is revolved in synchronism and in spatial phase with the other rotary contacts 45, 46.

It will be seen that the conductor shown connected to stationary contact 152 will always receive the amplified signal of transducer 1' and no other. Similarly, the conductor connected to stationary contact 153 always receives the amplified signal of data channel 2 and no other, and so on. Hence, this auxiliary allows the variations of one channel to be followed and to be recorded, if desired, upon a permanent record oscillograph, magnetic tape, or otherwise. With 40 channels and a sampling frequency for all channels of 400 per second, each channel is sampled 10 times per second, a fully adequate rate.

In this way I achieve the objects of my invention. In brief, it can be said that I provide an apparently simultaneous display of the essentially instantaneous values of electrical energy in a multiplicity of data channels by rapidly taking samples therefrom in sequence without regard to the zero axis level thereof and then restore this level through timed gating and clamping of the resulting multiple signal. The sampling process is normally carried on at a rate sufficiently rapid so that when the amplitude control, variable resistor 48, for any one channel is adjusted the representation for that channel on the oscilloscope screen, Fig. 2, changes simultaneously insofar as the eye can discern. With other slowly responsive systems of the prior art the operator must wait for a recognizable period of time for the amplitude representation to change after making such an adjustment.

The inability of the devices of the prior art to follow rapid variations in the data channels is thus manifest. There is no important barrier in my system to sampling and representation upon the cathode-ray oscilloscope at supersonic or even radio frequencies. It is only necessary that the characteristics of transformer 9 and the constants of the amplifiers and auxiliary circuits be chosen to provide operation in the resulting frequency band.

In describing the above preferred embodiment of my invention certain accepted practices have been employed. The heaters and heater circuit for the several vacuum tubes have not been shown for sake of clarity. These are conventional. Also, plate supply voltage sources 64 and 65 may be voltage regulated power supplies, connected with polarities as shown.

Certain variations of my device are also possible. Electrostatic rather than magnetic deflection may be employed in the cathode-ray tube. The general aspects of this modification are well known; amplifiers 14 and 18 are merely adapted to provide a relatively high-voltage high-impedance output rather than a low-impedance high-current output and cathode-ray tube 16 is constructed with internal deflection plates rather than being provided with external deflection coils 82 and 92. The relative capacitance of the differentiating capacitor 93 is reduced and the resistance of resistor 94 perhaps also reduced to secure complete differentiation at these elements; i. e., curve 40 of Fig. 3 directly from staircase curve 38.

Also as an alternate arrangement the channel source impedance resistor 51 may be composed of two resistors, each having half the resistance of the one shown. One of the half-value resistors is substituted for resistor 51 in Fig. 4 and the other is inserted in the other side of the channel adjacent to stationary contact 49. This modification tends to balance the input impedance between the two conductors 4, but I have found that the original circuit of Fig. 4 is satisfactory as to common mode rejection, notwithstanding.

The partial integration afforded by elements 80 and 81 in the vertical deflection amplifier can be accomplished instead by a capacitor in the feedback loop (77, 78) of that amplifier. High frequencies being thereby fed back at greater amplitude the same are attenuated more than the low frequencies in the amplifier proper, thus partial integration is accomplished.

I have described an embodiment proven to give superior performance to other possible variations and one suited for manufacture as an electronic instrument of precision. Variations are possible, of course, in the nature of the vacuum tubes; pentodes or other multigrid vacuum tubes may be employed instead of triodes and silicon, germanium or other crystal diodes may be used where vacuum tube diodes have been shown, save for double gate 124, 125 where performance would be impaired in practice. Certain of the variable resistors shown may be replaced with fixed resistors of appropriate values where size and weight may be a factor and should human supervision not be contemplated. By the same token, additional controls may be provided to allow extreme adjustability.

The variable input control in each data channel, potentiometer 48, may likewise be omitted for simplicity.

The zero axis in Fig. 2 may be arranged at one extreme polarity and all signal excursions limited to one direction of polarity. In this instance the amplitude characteristic of D. C. amplifier 14 must be arranged to lie all in one polarity rather than half in opposite polarities.

Although a rotary switch is a preferred switching arrangement, this function may be accomplished by a stepping switch, a vibratory switch or a multiple electronic switch of either the cathode-ray electron beam type or of the multiple circuit element type.

Also, the cathode-ray tube of my device may be replaced or supplemented with a cathode-ray memory tube for storing data exhibited at any selected time. For supplemental use the deflection systems of the two tubes are connected in parallel, or in equivalent ways are made synchronously coactive.

The deflections upon cathode-ray tube 16 may be interchanged, of course, if needed, in which case a horizontal deflection amplifier is renamed a vertical deflection amplifier, and so on. Also, the deflections shown in Fig. 2 need not be at substantially right angles to the 0 axis as shown, but may be at any angle upon suitably altering the relative positions of deflecting coils 82 and 92, or the equivalent deflection plates.

In Fig. 4 arrows have been placed on some conductors to indicate the direction of flow of the main signals in the circuits.

Other variations in size, proportions, specific component values and other details may be made without departing from the scope and spirit of my invention as set forth in the following claims.

Having now fully described my invention and the manner in which it is to be practiced, I claim:

1. Oscilloscopic means for exhibiting the magnitudes of electrical energies in electrical channels comprising impedance means, switching means, both said impedance means and said switching means connected to said channels, only one transformer connected to said switching means and to amplifying means, electrical means connected to said switching means to form a waveform, cathode-ray means having deflection means, said electrical means connected to said deflection means, electrical clamping means, means to synchronize said clamping means to said waveform, said clamping means connected to said amplifying means, said electrical energies amplified by said amplifying means and the zero axis successively restored by said clamping means, said amplifying means also connected to said deflection means; the recited elements coacting to display the magnitude of energy for each channel upon said cathode-ray means.

2. Oscilloscopic means for exhibiting the magnitudes of electrical energies in electrical channels comprising impedance means, switching means having contacts, both said impedance means and said switching means connected to said channels, only one transformer connected to said switching means and to amplifying means, means connected to said switching means to form an electrical waveform, cathode-ray means having deflection and blanking means, said means connected to said deflection means, low impedance electrical clamping means, means to synchronize said clamping means to said electrical waveform, said clamping means connected to said amplifying means, said electrical energies amplified by said amplifier and the zero axis successively restored by said clamping means, said amplifying means also connected to said deflection means; the recited elements coacting to display the magnitude of energy for each channel upon said cathode-ray means by a dot terminated trace.

3. Oscilloscopic means for exhibiting the magnitudes of electrical energies in electrical channels comprising impedance means, switching means having contacts, both said impedance means and said switching means connected to said channels, one transformer connected to said switching means and to amplifying means, electrical spacing means connected to said switching means, deflection amplifying means connected to said spacing means, cathode-ray means having deflection means, said deflection amplifying means connected to said deflecting means, low impedance electrical clamping means, said clamping means connected to said spacing means for synchronization thereto and also to said amplifying means, said electrical energies amplified by said amplifying means and the zero axis reference successively restored by said clamping means, said amplifying means also connected to said deflection means, cathode-ray blanking means connected to said spacing means for synchronous coaction therewith; the recited elements coacting to display a representation upon said cathode-ray means of the magnitude of energy for each channel and another representation of zero axis, said representations connected by a trace.

4. Oscilloscopic means for exhibiting the magnitudes of electrical energies in electrical channels comprising impedance means, switching means having contacts, both said impedance means and said switching means connected to said channels, one transformer connected to said switching means and to amplifying means, dot spacing means connected to said switching means to form an electrical waveform, deflection amplifying means connected to said dot spacing means, cathode-ray means having deflection means, said deflection amplifying means connected to said deflection means, low impedance electrical clamping means, means to synchronize said clamping means to said electrical waveform, said clamping means connected to said amplifying means, said electrical energies amplified by said amplifying means and the zero axis reference successively restored by said clamping means, said amplifying means also connected to said deflection means, cathode-ray blanking means connected to said cathode-ray means and to said dot spacing means for synchronization thereto; the recited elements coacting to display a dot upon said cathode-ray means representing the magnitude of energy for each channel and another dot representing said zero axis reference, said dots connected by a trace.

5. An oscilloscope for exhibiting the magnitudes of electrical energies in electrical channels having impedance means comprising switching means having contacts connected to said impedance means, a single transformer connected to said switching means and to an amplifier, said amplifier having integrating means, means connected to said switching means to form a waveform having sharp alterations of electrical amplitude, a first deflection amplifier connected to said means, cathode-ray means having deflection means and a screen, said first deflection amplifier connected to said deflection means, low impedance electrical clamping means, means to synchronize said clamping means to said waveform, said clamping means connected to said amplifier, said electrical energies amplified by said amplifier and the zero axis thereof successively restored by said clamping means, said amplifier also connected to said deflection means, cathode-ray blanking means connected to said means and to said cathode-ray means; the recited elements coacting to display a dot representing the amplitude of energy for each channel and another dot representing said zero axis for each channel, said dots connected by a trace upon the screen of said cathode-ray means.

6. An oscilloscope for exhibiting the magnitudes of electrical energies in electrical channels having charge accumulating means comprising a switch having contacts connected to said channels, a transformer connected to said switch and to an amplifier, other means connected to said switch to form a staircase electrical waveform, a first deflection amplifier connected to said other means, cathode-ray means having deflection means and a screen, said first deflection amplifier connected to said deflection means, electrical clamping means, low impedance connective means to synchronize said clamping means to said staircase waveform, said clamping means connected to said amplifier, said electrical energies amplified by said amplifier and the axis reference restored by said clamping means alternately in time, integrating means and a second deflection amplifier serially connected to said amplifier, said second deflection amplifier connected to said deflection means, cathode-ray blanking means synchronized to said staircase waveform; the recited elements coacting to display upon the screen of said cathode-ray means a dot representing the amplitude of energy for each channel and another dot representing said axis reference for each channel, said dots connected by a trace.

7. An oscilloscope for exhibiting the magnitudes of electrical energies in electrical channels comprising a switch having contacts connected to said channels and to capacitors thereacross, a transformer connected to said switch and to an amplifier, means connected to said switch to form a stepped electrical waveform, a first deflection amplifier connected to said means, a cathode-ray tube having deflection means, said first deflection amplifier connected to said deflection means, electrical clamping means, low impedance means to actuate said clamping means, means to synchronize said clamping means to said stepped waveform, said clamping means connected to said amplifier, said electrical energies amplified by said amplifier part time and the axis reference restored by said clamping means at other times, integrating means and a second deflection amplifier connected to said amplifier, said second deflection amplifier connected to said deflection means, cathode-ray blanking means coactively connected to said cathode-ray tube and to said means to form the stepped waveform; the recited elements coacting to display on the screen of said cathode-ray tube a dot by position representing the amplitude of energy for each channel and another dot representing said axis reference for each channel, said dots connected by a trace.

8. An oscilloscope for exhibiting the magnitudes of electrical energies in electrical channels comprising a capacitor connected to each channel, a switch having contacts connected to each said channel, a transformer connected to said switch and to an amplifier, resistor-capacitor means connected to said switch to form a stepped electrical waveform, a first deflection amplifier connected to said resistor-capacitor means, a cathode-ray tube having deflection means, said first deflection amplifier connected to said deflection means, electrical clamping means, low impedance means to actuate said clamping means, means to synchronize said clamping means from said stepped waveform, said clamping means connected to said amplifier; said electrical energies amplified by said amplifier during part time and the axis reference restored in said amplifier by said clamping means at other successive times, integrating means connected to said amplifier, a second deflection amplifier connected to said integrating means to further amplify said electrical energies, said second deflection amplifier connected to said deflection means, blanking means connected to said means to synchronize and to said cathode-ray tube; said first deflection amplifier and said deflection means coacting to position a representation upon the screen of said cathode-ray tube at separate locations, and said second deflection amplifier, said blanking means and said deflection means coacting to represent the magnitude of each of said electrical energies from the reference restored by said clamping means, the display appearing as a dot at the magnitude of each of said electrical energies and as another dot at said reference with a trace connecting the two said dots.

9. An oscilloscope for exhibiting the magnitude of a plurality of electrical energies in electrical channels comprising a capacitor connected to each channel, a switch having contacts connected to each said channel and to resistors, a transformer connected to said switch and to an amplifier, an attenuator connected to other contacts of said switch, another capacitor connected to said attenuator through said switch to form a stepped electrical waveform, a first deflection amplifier connected to said another capacitor, a cathode-ray tube having two deflection means, said first deflection amplifier connected to one of said deflection means, electrical clamping means, synchronizing means connected to said clamping means for synchronization thereof from said stepped waveform, said clamping means connected to said amplifier, low impedance cathode-follower means to drive said clamping means; the channel electrical energies amplified by said amplifier during brief periods of time and the axis reference restored in said amplifier by said clamping means at other brief periods of time, integrating means connected to said amplifier, a second deflection amplifier connected to said integrating means to further amplify said electrical energies, said second deflection amplifier connected to the other said deflection means, blanking means connected to said synchronizing means and to said cathode-ray tube; said first deflection amplifier and said one deflection means coacting to produce a visual representation at separate locations upon the screen of said cathode-ray tube, said blanking means coacting to blank out said visual representation prior to the display of each of said electrical energies, and said second deflection amplifier and said other deflection means coacting to represent the magnitude of each of said electrical energies from the reference restored by said clamping means, the display appearing as a dot at the maximum excursion of each of said electrical energies and as another dot at said reference with a trace connecting the two said dots occasioned by the coaction of said integrating means.

10. An oscilloscope for exhibiting the magnitude of a plurality of electrical energies in electrical channels comprising a switch having a plurality of contacts connected to said channels, to capacitors connected across said channels and to resistors connected to said channels, a transformer connected to said switch and to an amplifier, an attenuator connected to other contacts of said switch, a second capacitor connected to said attenuator through said switch to form a stepped electrical waveform, a first deflection amplifier connected to said capacitor, a cathode-ray tube having two deflection means, said first deflection amplifier connected to one of said deflection means, oscillatory means connected for synchronization to said stepped waveform, electrical clamping means, said clamping means connected to said oscillatory means for synchronization-actuation therefrom through low impedance cathode-follower means, the output of said clamping means connected to said amplifier; individual channel electrical energies amplified by said amplifier during brief periods of time and the axis reference alternately restored in said amplifier by said clamping means at successive brief periods of time, integrating means connected to said amplifier, a second deflection amplifier connected to said integrating means to further amplify said electrical energies, said second deflection amplifier connected to the other said deflection means, further oscillatory means connected for synchronization to said stepped waveform, said further oscillatory means connected to said cathode-ray tube to blank out the beam thereof just prior to the display of the magnitude of each of said electrical energies; said first deflection amplifier and said one deflection means coacting to position the electron beam of said cathode-ray tube at separate locations on the screen thereof, and said second deflection amplifier and said other deflection means coacting to display the magnitude of each of said electrical energies from the reference restored by said clamping means, the display appearing as a dot at the maximum excursion of each of said electrical energies and as another dot at said reference with a trace connecting the two said dots occasioned by the coaction of said integrating means.

11. An oscilloscope for exhibiting the magnitude of electrical energies in electrical channels comprising a switch having contacts connected to said channels, a capacitor connected across each channel, a resistor connected in each channel, a dummy resistor connected to other contacts of said switch to maintain the channel source impedance constant during commutation from channel to channel, means to contact said contacts, a transformer, the primary of said transformer connected to said means to contact, an amplifier connected to the secondary of said transformer, means connected to said switch to form a stepped electrical waveform having a change in amplitude just prior to said means to contact contacting the contacts of each said channel, a second amplifier connected to said means to form the stepped electrical waveform, a cathode-ray tube having deflection means, said second amplifier connected to said deflection means, wave-shaping means connected to said second amplifier to form pulses at the step changes of said stepped waveform, oscillatory means connected to said wave-shaping means for synchronization, clamping means, cathode-follower tubes, said cathode-follower tubes connected to said oscillatory means and to said clamping means for the low impedance actuation of said clamping means by said oscillatory means, said clamping means connected to said amplifier; the electrical energy of each said channel amplified by said amplifier during the duration of said energy as determined by the operation of said switch and the zero axis of said energy determined by said clamping means restored in said amplifier during the intervals between said durations, further wave-shaping means connected to said amplifier to reduce the rapidity of change of amplitude of said electrical energies, a third amplifier connected to said further wave-shaping means to further amplify said electrical energies, said third amplifier also connected to said deflection means, blanking means connected to said wave-shaping means for synchronization thereby, said blanking means also connected to said cathode-ray tube to blank out the trace thereof before the occurrence of each channel signal; said second amplifier and said deflection means coacting to position the trace of said cathode-ray tube at positions across the screen thereof, said third amplifier and said deflection means coacting to display the magnitude of each said electrical energy at an angle to the direction of successive said positions as distance from the zero axis determined by said clamping means, said display appearing as a dot at the maximum excursion of each said electrical energy and as another dot at said zero axis with a line connecting the two dots by coaction of said further wave-shaping means.

12. An oscilloscope for exhibiting the magnitude of a plurality of electrical energies in electrical channels comprising a rotary switch having contacts, stationary contacts of said switch connected to said channels, a capacitor connected across each channel, a resistor connected in each channel, a dummy resistor connected to staionary contacts of said switch adjacent to said stationary contacts connected to said channels to maintain the source impedance constant during commutation from channel to channel, rotary contacts to contact said stationary contacts, a transformer, the primary of said transformer connected to said rotary contacts, an amplifier connected to the secondary of said transformer, other stationary and rotary contacts on said rotary switch, means connected thereto to form a stepped electrical waveform having a change in amplitude just prior to the rotary contacts connected to said transformer contacting the stationary contacts of each said channel, a deflection amplifier connected to said means to form the stepped electrical waveform, a cathode-ray tube having deflection means, said deflection amplifier connected to said deflection means, differentiating means connected to said deflection amplifier to form pulses at the step changes of said stepped waveform, a relaxation oscillator connected to said differentiating means for synchronization, clamping means, cathode-follower tubes, said cathode-follower tubes connected to said relaxation oscillator and to said clamping means for the low impedance acutation of said clamping means by said relaxation oscillator, said clamping means connected to said amplifier; the electrical energy of each said channel amplified by said amplifier during the duration of said energy as determined by the operation of said rotary switch and the zero axis of said energy determined by said clamping means restored in said amplifier during the intervals between said durations, integrating means connected to said amplifier to reduce the rapidity of change of amplitude of said electrical energies, a second deflection amplifier connected to said integrating means to further amplify said electrical energies, said second deflection amplifier also connected to said deflection means, blanking means connected to said differentiating means for synchronization thereby, said blanking means also connected to said cathode-ray tube to blank out the trace thereof before the occurrence of each channel signal; said deflection amplifier and said deflection means coacting to position the trace of said cathode-ray tube at positions across the screen thereof, said second deflection amplifier and said deflection means coacting to display the magnitude of each said electrical energy at substantially a right angle to the direction of successive said positions as distance from the zero axis determined by said clamping means, said display appearing as a dot at the maximum excursion of each said electrical energy and as another dot at said zero axis with a line connecting the two dots by coaction of said integrating means.

13. An oscilloscope for exhibiting the magnitude and polarity of a plurality of electrical energies in electrical channels comprising a rotary switch having contacts, stationary contacts of said switch connected to said channels, a capacitor connected across each channel, a resistor connected in each channel, a dummy resistor connected to stationary contacts of said switch adjacent to said stationary contacts connected to said channels to maintain the source impedance constant during commutation from channel to channel, rotary contacts to contact said stationary contacts, a transformer, the primary of said transformer connected to said rotary contacts, a feedback amplifier connected to the secondary of said transformer, other stationary and rotary contacts on said rotary switch, means connected thereto to form a stepped electrical waveform having a change in amplitude just prior to said rotary contacts connected to said transformer contacting the stationary contacts of each said channel, a horizontal deflection amplifier connected to said means to form the stepped electrical waveform, a cathode-ray tube having deflection means, said horizontal deflection amplifier connected to said deflection means and differentiating means connected to that connection to form synchronizing pulses at the step changes of said stepped waveform, a multivibrator connected to said differentiating means for synchronization, a clamp circuit, cathode-follower tubes, said cathode-follower tubes connected to said multivibrator and to said clamp circuit for the low impedance actuation of said clamp circuit by said multivibrator, said clamp circuit connected to said feedback amplifier; the electrical energy of each said channel amplified by said feedback amplifier during the duration of said energy as determined by the operation of said rotary switch and the zero axis of said energy determined by said clamp circuit restored in said feedback amplifier during the intervals between said durations, integrating means connected to said feedback amplifier to reduce the rapidity of change of amplitude of said electrical energies, a deflection amplifier connected to said integrating means to further amplify said electrical energies, said deflection amplifier also connected to said deflection means, blanking means connected to said differentiating means for synchronization thereby, said blanking means also connected to said cathode-ray tube to blank out the trace thereof before the occurrence of each channel signal; said horizontal deflection amplifier and said deflection means coacting to position the trace of said cathode-ray tube at positions across the screen thereof, said deflection amplifier and said deflection means coacting to display the magnitude of each said electrical energy at substantially a right angle to the direction of successive said positions as distance from the zero axis determined by said clamp circuit and polarity by the direction of said distance from said zero axis, said display appearing as a dot at the maximum excursion of each said electrical energy and as another dot at said zero axis with a line connecting the two dots by coaction of said integrating means.

14. An oscilloscope for exhibiting within the period of persistence of vision the magnitudes and polarities of a plurality of electrical energies in separate electrical channels comprising means in shunt to the source of electrical energy in each channel for adjusting the gain thereof, a rotary switch having contacts, one stationary contact in each of two series of stationary contacts connected to each channel through a resistor, a capacitor connected across each said channel, a dummy resistor connected in shunt to the next stationary contact after said one stationary contact in each of said two series of stationary contacts of said switch, said dummy resistor having the same resistance as said resistor to maintain the source impedance constant during commutation from channel to channel, two rotary contacts aligned to contact corresponding stationary contacts in said two series of stationary contacts, a transformer, the primary of said transformer connected to said two rotary contacts, a feedback amplifier having a cathode-follower tube, the secondary of said transformer connected to said amplifier; other stationary contacts upon said rotary switch and a step attenuator connected thereto, a second capacitor connected to a third rotary contact aligned with said two rotary contacts to form a stepped electrical waveform having a change in amplitude just prior to said two rotary contacts contacting each electrical channel, a horizontal deflection amplifier connected to said second capacitor, a cathode-ray tube having deflection means, said horizontal deflection amplifier connected to said deflection means, a differentiator connected to said deflection means to form pulses at the step changes in amplitude of said stepped waveform, a multivibrator, said multivibrator connected to said differentiator for synchronization therefrom, a gated clamp circuit, a pair of cathode-follower tubes, said gated clamp circuit connected to said pair of cathode-follower tubes for actuation at low impedance thereby, said pair of cathode-follower tubes connected to said multivibrator for synchronous actuation thereby, the output connection of said gated clamp circuit connected to the cathode-follower tube of said feedback amplifier; the electrical energy of each said channel amplified by said feedback amplifier during the duration of said energy as determined by the operation of said rotary switch and the zero axis of said energy determined by said gated clamp circuit restored in said feedback amplifier during the intervals between said durations; an integrator connected to said feedback amplifier to reduce the rapidity of change of switching amplitudes of said electrical energies, a direct-coupled vertical deflection amplifier connected to said integrator to further amplify said electrical energies, said vertical deflection amplifier also connected to said deflection means; a second multivibrator, said second multivibrator connected to said differentiator for synchronization, said second multivibrator also connected to said cathode-ray tubes to briefly extinguish the spot of light on the screen before the occurrence of each channel signal; said horizontal deflection amplifier and said deflection means coacting to position the electron beam of said cathode-ray tube at a plurality of positions across the screen thereof, said vertical deflection amplifier and said deflection means coacting to display the magnitude and polarity of each said electrical energy at right angles to said plurality of positions as distance and direction from the zero axis level determined by said gated clamp circuit, said display appearing as a dot at the maximum excursion of each said electrical energy and as another dot as said zero axis level with a line connecting the two dots by coaction of said integrator, said second multivibrator coacting to remove a brief transient leading each channel display and the first mentioned multivibrator coacting to remove a brief transient following each channel display.

15. A multichannel oscilloscope for exhibiting within the period of persistence of vision the magnitudes and polarities of a plurality of electrical energies in separate electrical channels comprising a potentiometer in shunt to the source of electrical energy in each channel for adjusting the gain thereof, a rotary switch having contacts, one stationary contact in each of two series of stationary contacts connected to each channel through a series resistor, a capacitor connected across each said channel, a dummy resistor connected in shunt to the next stationary contact after said one stationary contact in each of said two series of stationary contacts of said switch, said dummy resistor having the same resistance as said series resistor to maintain the source impedance constant during commutation from channel to channel, two rotary contacts aligned to contact corresponding stationary contacts in said two series of stationary contacts, a transformer, the primary of said transformer connected to said two rotary contacts, the secondary of said transformer connected to a fixed resistor, a feedback amplifier having a cathode-follower vacuum tube, said secondary connected to said amplifier; a fifth stationary contact for each channel in a third series of stationary contacts located slightly in advance of said one contact, a step attenuator, potential means connected to said attenuator, each step of said attenuator connected to one of said fifth stationary contacts, a second capacitor connected to a third rotary contact aligned with said two rotary contacts to maintain the potential of one fifth stationary contact until the next fifth stationary contact is contacted by said third rotary contact to form a stepped electrical waveform having a change in amplitude just prior to said two rotary contacts contacting each electrical channel, a horizontal deflection amplifier, the first tube grid thereof connected exclusively to said second capacitor, a cathode-ray tube having deflection means, said horizontal deflection amplifier connected to said deflection means, a differentiator connected to said deflection means to form pulses at the step changes in amplitude of said stepped waveform, a multivibrator, said multivibrator connected to said differentiator for synchronization therefrom, a gated clamp circuit, a pair of cathode-follower vacuum tubes, said gated clamp circuit connected to said pair of cathode-follower vacuum tubes for actuation at low impedance thereby, said pair of cathode-follower vacuum tubes connected to said multivibrator for synchronous actuation thereby, the output connection of said gated clamp circuit connected to the cathode-follower vacuum tube of said feedback amplifier; the electrical energy of each said channel amplified by said feedback amplifier during the duration of said energy as determined by the operation of said rotary switch and the zero axis of said energy determined by said gated clamp circuit restored in said feedback amplifier during the intervals between said durations; an integrator connected to said feedback amplifier to reduce the rapidity of change of switching amplitudes of said electrical energies, a direct-coupled vertical deflection amplifier connected to said integrator to further amplify said electrical energies, said vertical deflection amplifier also connected to said deflection means; a second multivibrator, said second multivibrator connected to said differentiator for synchronization, said second multivibrator also connected to said cathode-ray tube to briefly extinguish the spot of light on the screen before the occurrence of each channel signal, a fourth rotary contact connected to the cathode-follower vacuum tube of said feedback amplifier, and a stationary contact for each said channel to provide a separate amplified output of electrical energy signal for each of said channels; said horizontal deflection amplifier and said deflection means coacting to position the electron beam of said cathode-ray tube at a plurality of positions across the screen thereof, said vertical deflection amplifier and said deflection means coacting to display the magnitude and polarity of each said electrical energy at right angles to said plurality of positions as distance and direction from the zero axis determined by said gated clamp circuit, said display appearing as a dot at the maximum excursion of each said electrical energy and as another dot at said zero axis with a line connecting the two dots by coaction of said integrator, said second multivibrator coacting to remove a brief transient leading each channel display, and the first mentioned multivibrator coacting to remove a brief transient following each channel display.

16. A multichannel bar graph oscilloscope for exhibiting within the period of persistence of vision the magnitudes and polarities of a large plurality of electrical energies in separate electrical channels comprising a potentiometer in shunt to the source of electrical energy in each channel for adjusting the gain thereof, a motor-driven rotary switch having contacts, one stationary contact in each of two series of stationary contacts connected to each channel through one fixed series resistor, a capacitor connected across each said channel at the junction of the variable arm of said potentiometer and said series resistor, a dummy resistor connected in shunt to the next stationary contact after said one stationary contact in each of said two series of stationary contacts of said switch, said dummy resistor having the same resistance as said series resistor to maintain the source impedance constant during commutation from channel to channel, two rotary contacts aligned to contact corresponding stationary contacts in said series of stationary contacts, a transformer, the primary of said transformer connected to said two rotary contacts, the secondary of said transformer shunt connected to a fixed resistor, a feedback amplifier having a cathode-follower vacuum tube, said secondary connected to a vacuum tube of said amplifier preceding said cathode-follower vacuum tube; a fifth stationary contact for each channel in a third series of stationary contacts located slightly in advance of said one contact, a resistive step attenuator, potential means connected to said attenuator, each step of said attenuator connected to one of said fifth stationary contacts, a second capacitor connected to a third rotary contact spatially aligned with said two rotary contacts to maintain the potential of one fifth stationary contact until the next fifth stationary contact is contacted by said third rotary contact to form a stepped electrical waveform having a change in amplitude just prior to said two rotary contacts contacting each electrical channel, a horizontal deflection amplifier, the first tube grid thereof connected exclusively to said second capacitor, a cathode-ray tube having two magnetic deflection means, said horizontal deflection amplifier connected to one of said deflection means, a differentiatior connected to said one deflection means to form pulses at the step changes in amplitude of said stepped waveform, a one-shot multivibrator, said multivibrator connected to said differentiator for synchronization therefrom, a gated clamp circuit, a pair of cathode-follower vacuum tubes, said gated clamp circuit connected to said pair of cathode-follower vacuum tubes for actuation at low impedance thereby, said pair of cathode-follower vacuum tubes connected to said multivibrator for synchronous actuation thereby, the output connection of said gated clamp circuit connected to the cathode-follower vacuum tube of said feedback amplifier; the electrical energy of each said channel amplified by said feedback amplifier during the duration of said energy as determined by the operation of said rotary switch and the zero axis level of said energy determined by said gated clamp circuit restored in said feedback amplifier during the intervals between said durations; a partial integrator connected to said feedback amplifier to reduce the rapidity of change of switching amplitudes of said electrical energies, a direct-coupled vertical deflection amplifier connected to said partial integrator to further amplify said electrical energies, said vertical deflection amplifier connected to the other said deflection means; a second one-shot multivibrator, said second multivibrator connected to said differentiator for synchronization, said second multivibrator also connected to the control grid of said cathode-ray tube to briefly extinguish the spot of light on the screen before the occurrence of each channel signal, a fourth rotary contact connected to the cathode of the cathode-follower vacuum tube of said feedback amplifier, and a sixth stationary contact in a fourth series for each said channel to provide a separate amplified output of electrical energy signal for each of said channels; said horizontal deflection amplifier and said one deflection means coacting to position the electron beam of said cathode-ray tube at a large plurality of positions across the screen thereof, said vertical deflection amplifier and said other deflection means coacting to display the magnitude and polarity of each said electrical energy at right angles to said plurality of positions as distance and direction from the zero axis level determined by said gated clamp circuit, said display appearing as a dot of light at the maximum excursion of each said electrical energy and another dot at said zero axis level with a line connecting the two dots by coaction of said partial integrator, said second multivibrator coacting to remove a brief transient leading each channel display, and the first mentioned multivibrator coacting to remove a brief transient following each channel display.

17. The oscilloscope of claim 16 in which the two cathode-ray tube deflection means are electrostatic.

18. The oscilloscope of claim 16 in which the cathode-ray tube has storage means for electronically retaining the display of the multichannel bar graph.

References Cited in the file of this patent

UNITED STATES PATENTS

| | | |
|---|---|---|
| 2,408,078 | Labin | Sept. 24, 1946 |
| 2,465,355 | Cook | Mar. 29, 1949 |
| 2,506,770 | Braden | May 9, 1950 |
| 2,527,712 | Dicke | Oct. 31, 1950 |
| 2,674,812 | Hales | Apr. 13, 1954 |
| 2,680,669 | Shepard | June 8, 1954 |
| 2,766,400 | Clark | Oct. 9, 1956 |